United States Patent
Ren et al.

(10) Patent No.: US 12,470,336 B2
(45) Date of Patent: Nov. 11, 2025

(54) HIGH SPEED BEAM MANAGEMENT

(71) Applicant: QUALCOMM Incorporated, San Diego, CA (US)

(72) Inventors: Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 17/758,251

(22) PCT Filed: Jan. 13, 2020

(86) PCT No.: PCT/CN2020/071662
§ 371 (c)(1),
(2) Date: Jun. 30, 2022

(87) PCT Pub. No.: WO2021/142565
PCT Pub. Date: Jul. 22, 2021

(65) Prior Publication Data
US 2023/0043616 A1    Feb. 9, 2023

(51) Int. Cl.
*H04L 5/00* (2006.01)
*H04W 52/02* (2009.01)
*H04W 76/28* (2018.01)

(52) U.S. Cl.
CPC .......... *H04L 5/0023* (2013.01); *H04L 5/0051* (2013.01); *H04W 52/0216* (2013.01); *H04W 76/28* (2018.02)

(58) Field of Classification Search
CPC ............... H04L 5/0023; H04L 5/0051; H04W 52/0216; H04W 76/28; H04W 72/51;
(Continued)

(56) References Cited

U.S. PATENT DOCUMENTS 10,932,122 B1 * 2/2021 Raghunathan .......... H04W 8/08
2014/0247765 A1    9/2014 Baghel et al.
(Continued)

FOREIGN PATENT DOCUMENTS

CN    103024879 A    4/2013
CN    104094644 A    10/2014
(Continued)

OTHER PUBLICATIONS

Nokia: "UE Power Consumption Reduction in RRM Measurements", R1-1901190, 3GPP TSG RAN WG1 Ad-Hoc Meeting 1901, Taipei, Taiwan, Jan. 21-25, 2019, 11 Pages.
(Continued)

*Primary Examiner* — Ayanah S George
(74) *Attorney, Agent, or Firm* — Patterson & Sheridan, L.L.P.

(57) ABSTRACT

Certain aspects of the present disclosure provide techniques for high speed beam management. A method that may be performed by a user equipment (UE) includes receiving beamformed signals from at least one base station (BS); determining that the UE is in a high mobility state and one or more parameters associated with the high mobility state, based on the received signals; transmitting at least one of the one or more parameters to the at least one BS; and communicating with the at least one BS based on the one or more parameters.

35 Claims, 14 Drawing Sheets

(58) Field of Classification Search
CPC ..... H04W 76/27; Y02D 30/70; H04B 7/0695; H04B 7/063
See application file for complete search history.

(56) References Cited

U.S. PATENT DOCUMENTS

| | | | |
|---|---|---|---|
| 2015/0215830 | A1 | 7/2015 | Dalsgaard et al. |
| 2017/0019820 | A1 | 1/2017 | Das |
| 2019/0289516 | A1 | 9/2019 | Zhang et al. |
| 2019/0387440 | A1 | 12/2019 | Yiu et al. |
| 2023/0116740 | A1* | 4/2023 | Niu ............... H04W 36/32 370/331 |

FOREIGN PATENT DOCUMENTS

| | | | | |
|---|---|---|---|---|
| CN | 109041098 | A | 12/2018 | |
| CN | 110383875 | A | 10/2019 | |
| WO | 2008083463 | A1 | 7/2008 | |
| WO | 2018017840 | A1 | 1/2018 | |
| WO | 2018085556 | A2 | 5/2018 | |
| WO | WO-2019039669 | A1 * | 2/2019 | ............. H04B 7/088 |

OTHER PUBLICATIONS

Supplementary Partial European Search Report—EP20914528—Search Authority—Munich—Sep. 1, 2023.
Broadcom Corporation: "Mobility Improvement for Long DRX", 3GPP TSG-RAN WG2 Meeting #85, R2-140423, Prague, Czech Republic, Feb. 10 to 14, 2014, Feb. 14, 2014 (Feb. 14, 2014) Section 2, 2 Pages.
International Search Report and Written Opinion—PCT/CN2020/071662—ISA/EPO—Oct. 15, 2020.
QUALCOMM Incorporated: "Beam Management in C-DRX", 3GPP TSG-RAN WG2 Meeting Ad-hoc, R2-1801261, Vancouver, Canada, Jan. 22-26, 2018, Jan. 26, 2018 (Jan. 26, 2018) the Whole Document, pp. 1-3.
Nokia, et al., "UE Power Consumption Reduction in RRM Measurements", 3GPP TSG RAN WG1 Ad-Hoc Meeting 1901, R1-1901190, Taipei, Taiwan, Jan. 21, 2019-Jan. 25, 2019, 9 Pages, Jan. 20, 2019.
Supplementary European Search Report—EP20914528—Search Authority—Munich—Feb. 6, 2024.

* cited by examiner

HIGH SPEED BEAM MANAGEMENT

CROSS-REFERENCE TO RELATED APPLICATIONS

This application is a national stage application under 35 U.S.C. 371 of PCT/CN2020/071662, filed Jan. 13, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to various techniques and apparatus for beam management when a user equipment is in a high mobility state.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam management in high speed applications.

Certain aspects provide a method for wireless communication by a user equipment (UE). The method generally includes receiving beamformed signals from at least one base station (BS); determining that the UE is in a high mobility state and one or more parameters associated with the high mobility state, based on the received signals; transmitting at least one of the one or more parameters to the at least one BS; and communicating with the at least one BS based on the one or more parameters.

Certain aspects provide a method for wireless communication by a base station (BS). The method generally includes receiving, from a UE, one or more parameters associated with a high mobility state of the UE; determining a first discontinuous reception (DRX) configuration based at least in part on the one or more parameters; transmitting an indication of the first DRX configuration to the UE; and communicating with the UE based on the first DRX configuration.

Certain aspects provide a method for wireless communication by a UE. The method generally includes transmitting, while the UE is in a high mobility state, beamformed signals to at least one base station (BS); receiving, from the at least one BS, an indication of a DRX configuration based at least in part on the high mobility state of the UE; and communicating with the at least one BS based on the DRX configuration.

Certain aspects provide a method for wireless communication by a BS. The method generally includes receiving beamformed signals from at least one user equipment (UE); determining that the at least one UE is in a high mobility state based on the received signals and a discontinuous reception (DRX) configuration based at least in part on the high mobility state of the at least one UE; transmitting, to the at least one UE, an indication of the DRX configuration; and communicating with the at least one UE based on the DRX configuration.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 5:
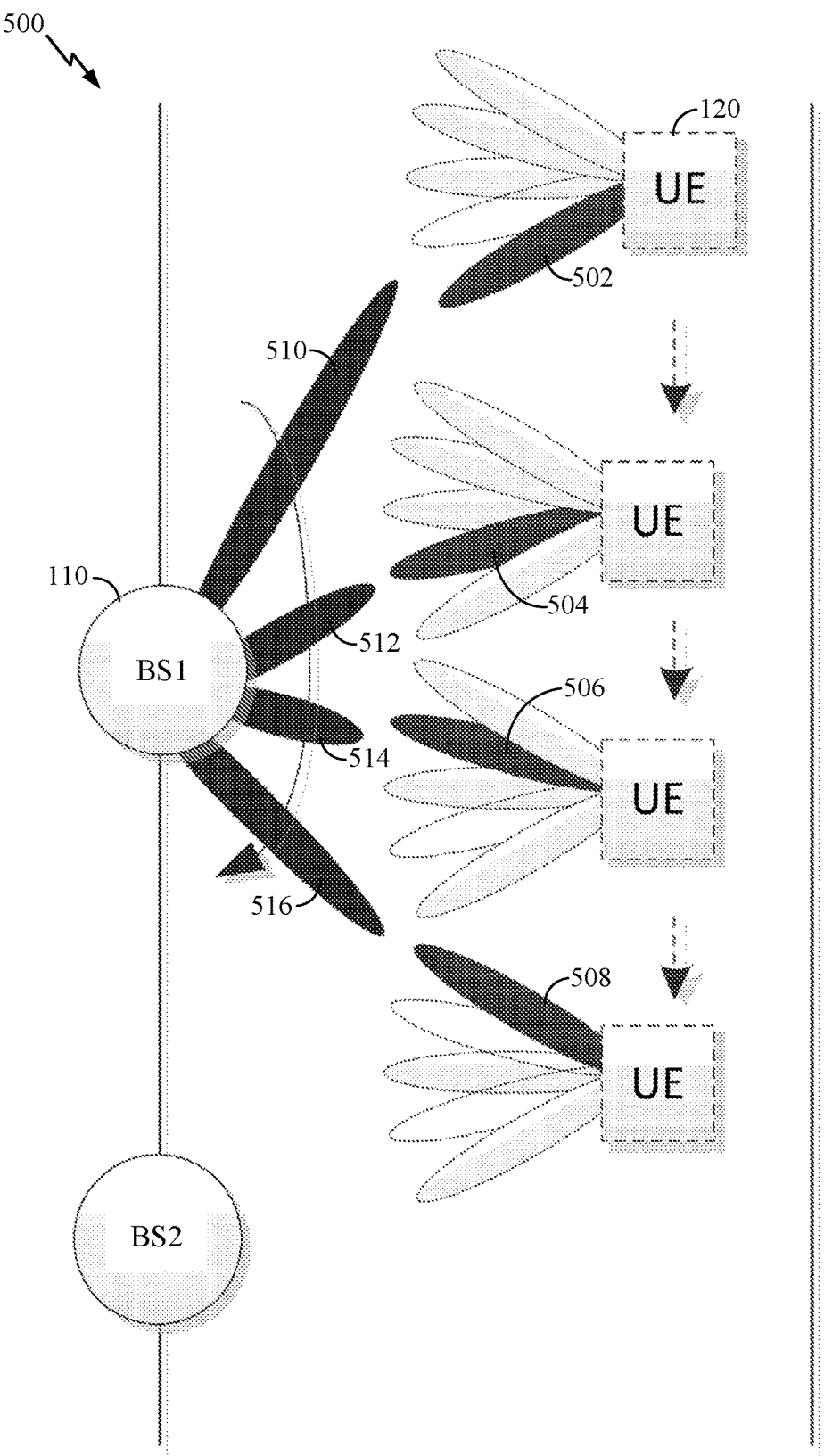
FIG. 5 illustrates an example of beam switching performed by a UE for high speed applications, in accordance with certain aspects of the present disclosure.

Aspects of the present disclosure provide apparatus, methods, processing systems, and computer readable mediums for managing beams in a discontinuous reception (DRX) cycle when a UE is in a high mobility state. In certain aspects, a UE may be configured with a DRX cycle that adapts to the Doppler shifts and angular variations of the angle of arrivals (AOAs) encountered by the UE while in a high mobility state. The DRX cycle may be adapted to have certain on durations of the DRX cycle aligned with the Doppler shifts and/or variations in the beam AOA. For example, the on duration of a long DRX cycle may be aligned with the cell edges where the UE encounters a known Doppler shift and beam AOA. In certain cases, the on durations of the short DRX cycle may be aligned with the angular variations of the beam AOA as the UE passes a BS, for example as depicted in FIG. 5.

The following description provides examples of high speed beam management in communication systems, and is not limiting of the scope, applicability, or examples set forth in the claims Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
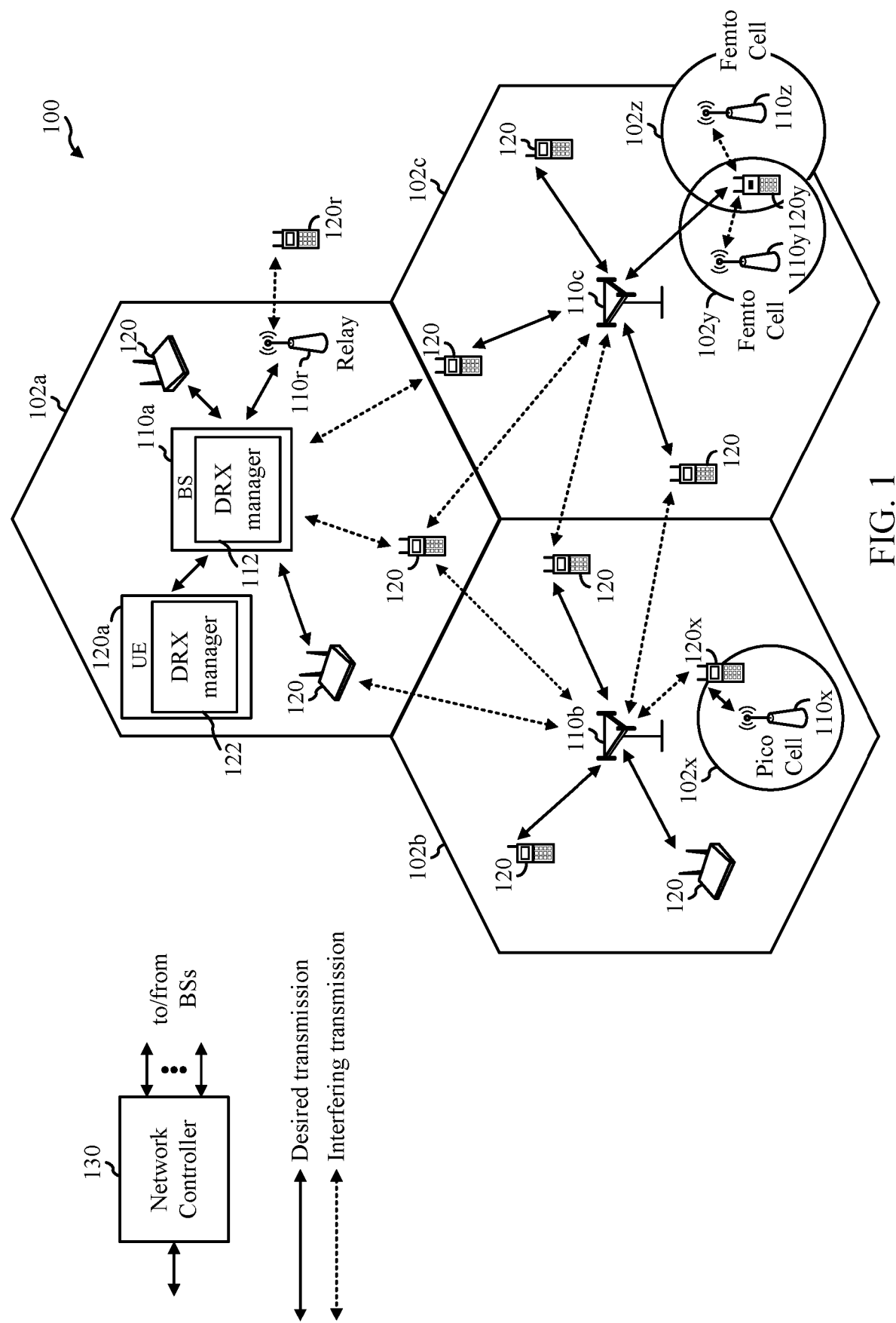
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As shown in FIG. 1, the BS 110*a* includes a DRX manager 112 that configures the UE with a DRX configuration adapted for a high mobility state of the UE, in accordance with aspects of the present disclosure. The UE 120*a* includes a DRX manager 122 that configures the UE with the DRX configuration adapted for a high mobility state of the UE, in accordance with aspects of the present disclosure.

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
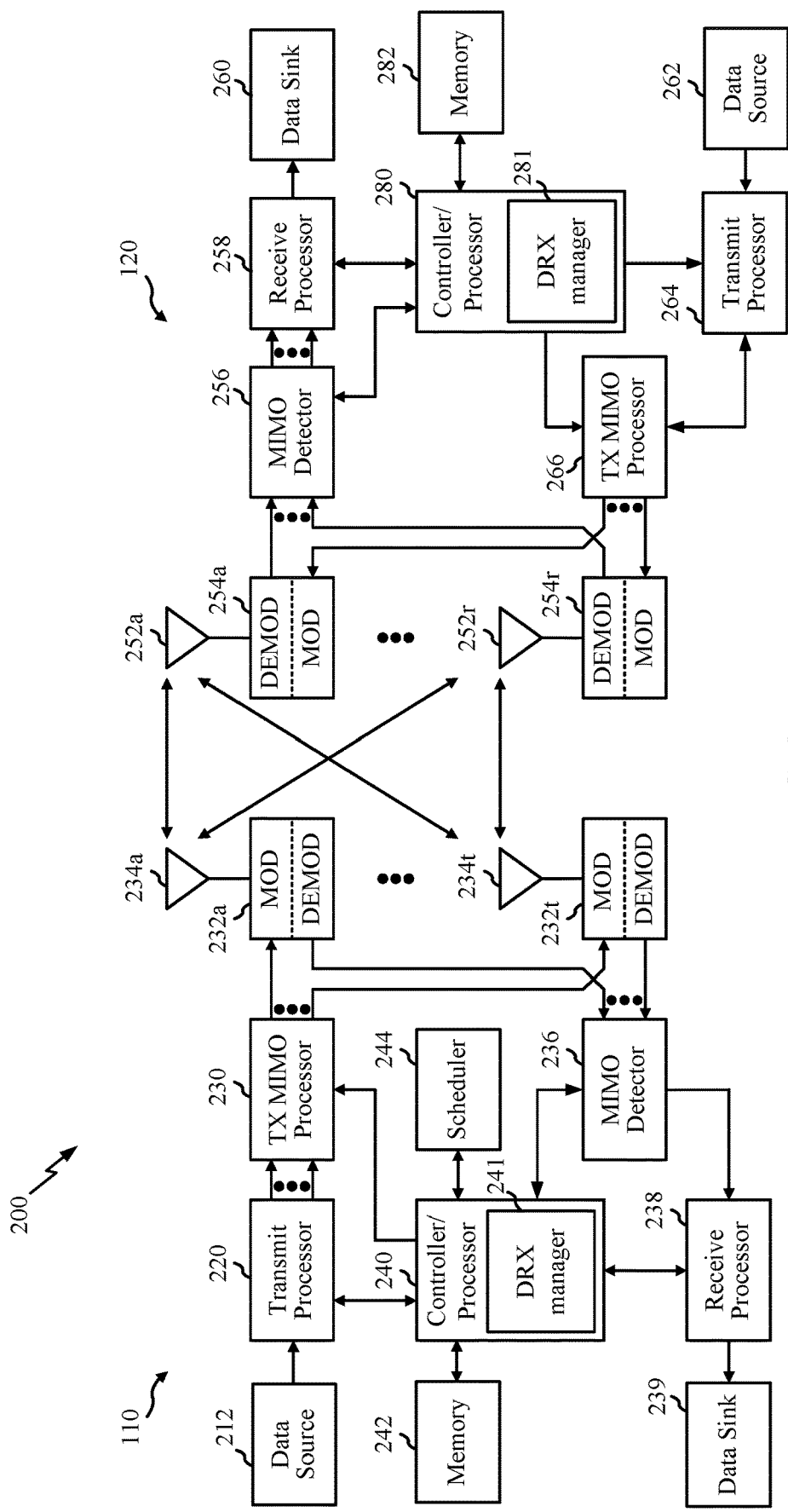
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120 may perform or direct the execution of processes for the techniques described herein. For example, as shown in FIG. 2, the controller/processor 240 of the BS 110 has a DRX manager 241 that configures the UE with a DRX configuration adapted for a high mobility state of the UE, according to aspects described herein. The controller/processor 280 of the UE 120 has a DRX manager 281 that configures the UE with the DRX configuration adapted for a high mobility state of the UE, according to aspects described herein. Although shown at the Controller/Processor, other components of the UE 120 and BS 110 may be used to perform the operations described herein.

Figure 3:
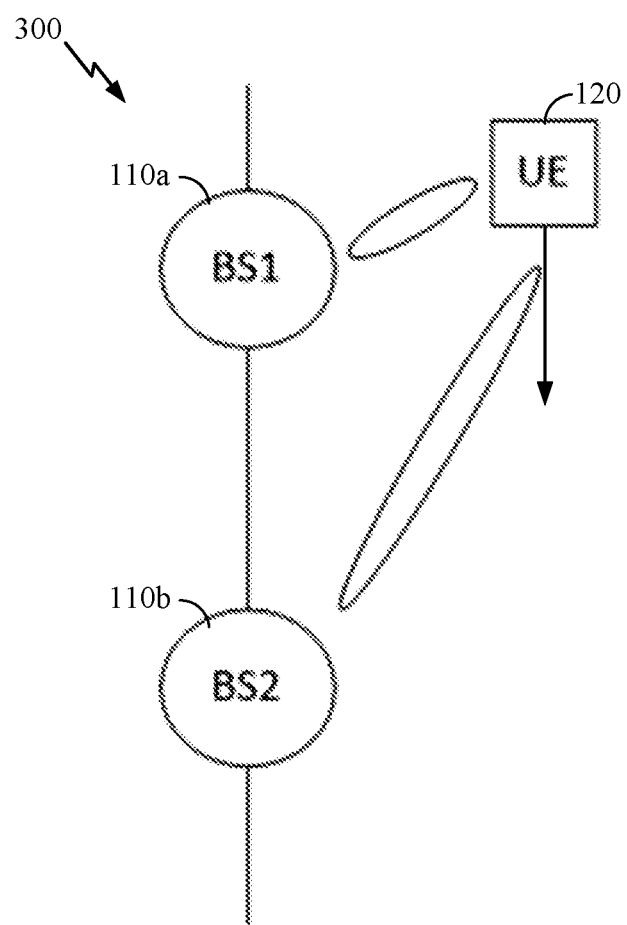
FIG. 3 is a diagram of an example wireless communication network for high speed applications, in accordance with certain aspects of the present disclosure.

In certain cases, UEs may be in a high mobility state, for example, when a UE is traveling on a high speed train, or when a UE is traveling in a tunnel. In such cases, the BSs may be arranged close to the track and in a linear deployment along the track or tunnel to provide continuous coverage. For example, FIG. 3 illustrates an example wireless communication network 300 where the BSs 110a and 110b are arranged along the track or tunnel, in accordance with certain aspects of the present disclosure. As multiple BSs may be arranged along the track or tunnel, the UE 120 may handover from one BS to another BS, for example, from the BS 110a and 110b. In high mobility scenarios, the UE may perform frequent handovers between adjacent BSs arranged along the track or tunnel, which may lead to increased latency and/or loss of connection. In certain cases, some BSs along the track or tunnel may have one or two remote radio heads (RRHs) providing coverage along a portion of the track or tunnel, which is different from a typical BS that provides circular coverage of a cell using radio heads arranged in three 120° sectors. To reduce inter-carrier interference (ICI) and improve handovers, the BSs arranged along the track or tunnel may communicate with the UEs at a single carrier frequency (e.g., 800 MHz, 4 GHz, or 30 GHz).

Figure 4A:
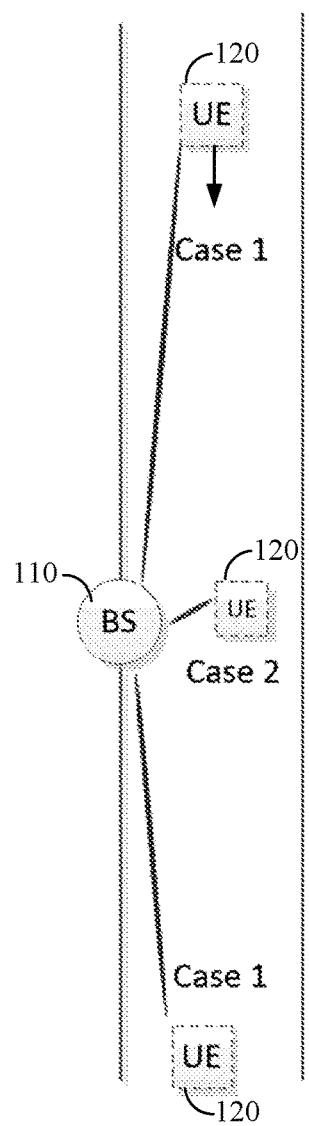
FIG. 4A is a diagram of example beam conditions for high speed applications, in accordance with certain aspects of the present disclosure.
Figure 4B:
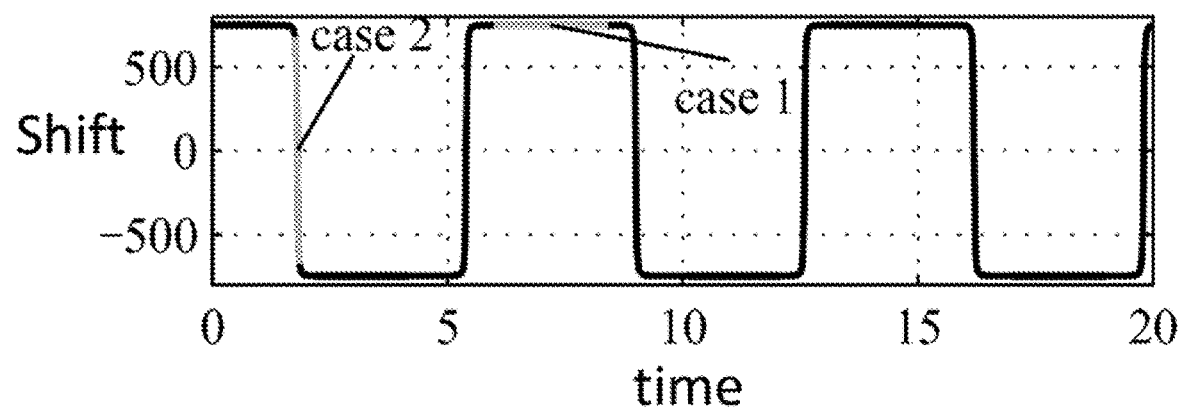
FIG. 4B illustrates an example Doppler shift encountered by a UE over time, in accordance with certain aspects of the present disclosure.

High mobility scenarios may exhibit large Doppler frequency shifts (e.g., >800 Hz). For example, FIGS. 4A and 4B illustrate the Doppler effect on wireless communications in a high mobility application, in accordance with certain aspects of the present disclosure. FIG. 4A illustrates a UE 120 in a high mobility state and communicating with a BS 110 in three different locations along the track (on the edges of the cell coverage of the BS 110 and as the UE 120 passes nearby the BS 110). FIG. 4B illustrates the Doppler shift encountered by the UE 120 over time. As the UE 120 travels along the track, the UE 120 may encounter, in general, two cases of Doppler shift. In the first case (case 1), for example, when the UE 120 is on the edge of the cell coverage of the BS 110, the UE 120 may experience a large Doppler shift (e.g., +800 Hz or −800 Hz), and frequency tracking may be difficult in such a case. In the second case (case 2), for example, when the UE 120 passes nearby the BS 110, the UE 120 may experience various Doppler shifts (e.g., from +800 Hz to −800 Hz or from −800 Hz to +800 Hz). While the examples provided herein are described with respect to the UE encountering the Doppler effect on wireless transmissions from the BS to facilitate understanding, aspects of the present disclosure may also be applied to the BS encountering the Doppler effect on wireless transmissions from the UE.

High mobility scenarios may also exhibit frequent angular variations of the angle of arrival (AOA) and/or angle of departure (AOD) of transmissions, for example, as the UE passes nearby the BS along the track or tunnel. As an example, FIG. 5 illustrates an example of the beam switching that a UE 120 and/or BS 110 may perform as the UE 120 passes nearby the BS 110. As shown, the UE 120 may communicate with the BS 110 by switching from beam 502, to beam 504, to beam 506, or to beam 508 as the UE 120 passes the BS 110. In certain cases, the BS 110 may communicate with the UE by switching from beam 510, to beam 512, to beam 514, or to beam 516 as the UE 120 passes the BS 110. In certain cases, the UE 120 and/or BS 110 may perform fast beam tracking/switching in order to maintain a connection.

A UE in a wireless communication network may operate in one of several modes, such as an idle mode or a connected mode, at any given moment. In the connected mode, the UE may actively exchange data with one or more BSs. In the idle mode, the UE may power down (or operate in a low power state) for a certain period of time to conserve power (e.g., battery power) and may wake up periodically to monitor for paging messages (e.g., on the PDCCH). The paging messages may alert the UE of an incoming call and/or data.

The UE may periodically monitor for paging messages based on a discontinuous reception (DRX) cycle. The DRX cycle may indicate when the UE monitors for paging messages and when the UE powers down or enters a low power mode. The UE may be configured with a DRX configuration having various parameters. For example, the DRX configuration parameters may include a DRX cycle, a long DRX cycle start offset, a DRX inactivity timer, an on-duration timer, a short DRX cycle, and a short DRX cycle timer. In certain cases, the UE may be configured with only a long DRX cycle or a long and short DRX cycle. In other words, the short DRX cycle may be optional, if a long DRX cycle is configured.

The radio access network (RAN) may implicitly indicate the DRX cycle to the UE via the subframe time and the long DRX cycle start offset, which provides the subframe where the Long and Short DRX cycle starts. The on-duration is the duration at the beginning of a DRX cycle when the UE is powered on to monitor for PDCCH transmissions. The DRX inactivity timer may specify the duration the UE remains powered on monitoring for new UL or DL transmissions. That is, the DRX inactivity timer is the duration after a PDCCH occasion in which the PDCCH indicates a new UL or DL transmission. When the DRX inactivity timer is on, the UE remains in 'ON state', which may extend the ON period into the OFF period (e.g., low power state). The short DRX cycle is a DRX cycle which can be implemented within the 'OFF' period of a long DRX cycle. The short DRX cycle timer is the duration the UE follows the Short DRX cycle. For instance, the short DRX cycle may be the consecutive number of subframes the UE follows the short DRX cycle after the DRX Inactivity Timer has expired.

Figure 6:
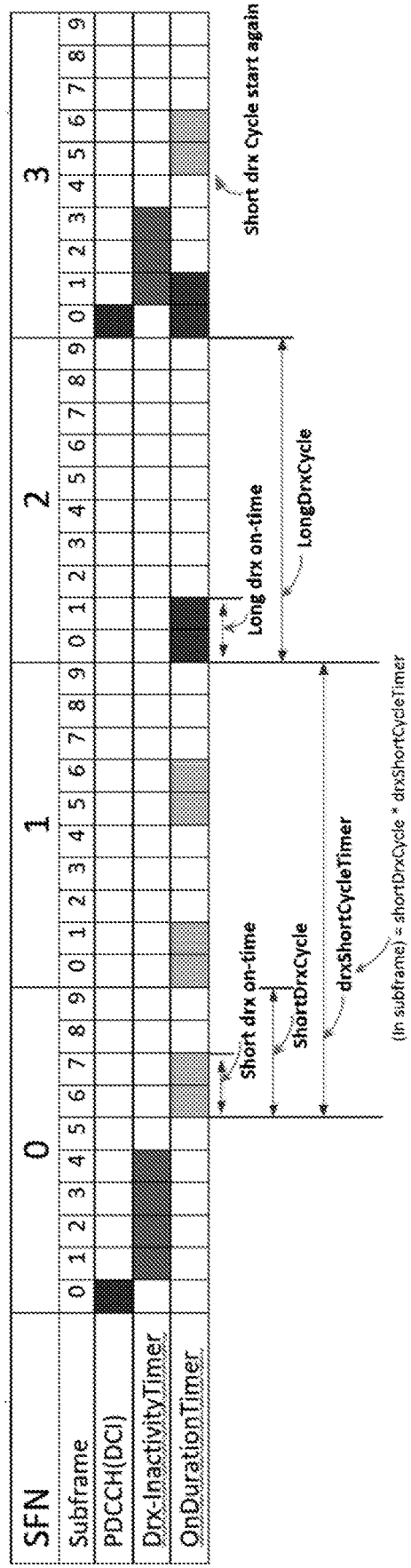
FIG. 6 illustrates an example discontinuous reception (DRX) cycle, in accordance with certain aspects of the present disclosure.

FIG. 6 illustrates an example DRX cycle implementation over four frames indicated by the subframe number (SFN). As shown, a UE may monitor the PDCCH at a PDCCH occasion, for example, at the first subframe of SFN0, and the DRX inactivity timer may run after the PDCCH occasion, for example, for the next four subframes. Following the expiration of the DRX inactivity timer, the short DRX cycle timer may begin running, and the UE may monitor PDCCH occasions during the beginning of one or more short DRX cycles. After the expiration of the short DRX cycle timer, the UE may switch to monitoring PDCCH occasions on the long DRX cycle, as shown in SFN2. In SFN3, the UE may receive a PDCCH message, which again triggers the short DRX cycles after the DRX inactivity timer expires.

Figure 7:
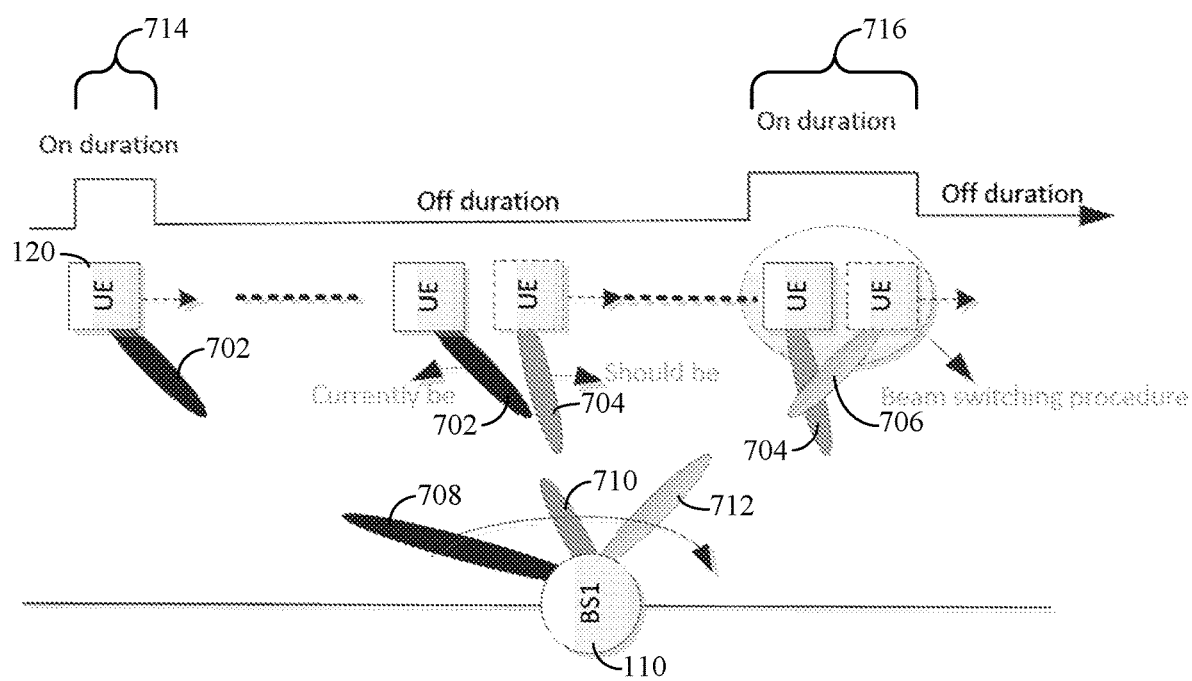
FIG. 7 illustrates an example of beam misalignment for high speed applications, in accordance with certain aspects of the present disclosure.

In high mobility scenarios (such as high speed train or tunnel applications), beam tracking and frequency tracking may be difficult when the UE is in a low power mode and monitoring PDCCH occasions in a DRX cycle (long or short). For example, FIG. 7 illustrates an example where beams between the UE 120 and BS 110 may become misaligned during a DRX cycle while the UE is in a high mobility state. As shown, the UE 120 may monitor a PDCCH occasion via beam 702 during the first on duration 714 of the DRX cycle. As the UE progresses on the track during the off duration of the DRX cycle, the UE 120 may continue to use the beam 702 to communicate with the BS 110 and experience a poor connection or connection loss with the BS 110 due to misalignment between the beams 702 and 710. During the next on duration 716 of the DRX cycle, the UE 120 may perform a beam switching procedure, for example switching from beam 704 to beam 706. In certain cases, the UE 120 may miss the PDCCH occasion during the beam switch procedure, resulting in a dropped page and increased latency. In certain aspects, the BS 110 may communicate with the UE 120 with various beams 708, 710, 712 as the UE 120 travels along the track.

Example High Speed Beam Management

Aspects of the present disclosure provide various apparatus and techniques for managing beams in a DRX cycle when a UE is in a high mobility state (e.g., moving at speeds of 350 km/h to 650 km/h). In certain aspects, a UE may be configured with a DRX cycle that adapts to the Doppler shifts and angular variations of the AOA/AOD encountered by the UE while in a high mobility state. The DRX cycle may be adapted to have certain on durations of the DRX cycle aligned with the Doppler shifts and/or variations in the beam AOA. For example, the on duration of a long DRX cycle may be aligned with the cell edges where the UE encounters a known Doppler shift and beam AOA. In certain cases, the on durations of the short DRX cycle may be aligned with the angular variations of the beam AOA as the UE passes a BS, for example as depicted in FIG. 5.

In certain aspects, the UE may report to the BS parameters indicating the high mobility state of the UE and in certain cases implement an updated DRX cycle configuration without input from the BS. For example, the UE may take measurements of signals from the BS and identify that the UE is in a high mobility state. The UE may report various parameters (e.g., measurements, event, or DRX configuration) associated with the high mobility state of the UE to the BS. In aspects, the UE may implement changes to the DRX cycle that adapt to the Doppler shifts and/or variations of the beam AOA.

In certain aspects, the UE may report the parameters to the BS, and the BS may configure the UE with the DRX cycle adapted for the high speed applications. For example, after reporting the parameters to the BS, the UE may receive, from the BS, an updated DRX configuration that adapts to the Doppler shifts and variations of the beam AOAs along the track or tunnel.

In certain aspects, the BS may direct the DRX cycle configuration for high speed applications. For example, the BS may take measurements of signals from the UE and configure the UE with a DRX configuration that adapts to the Doppler shifts and/or AOA variations of the high mobility state of the UE.

Figure 8:
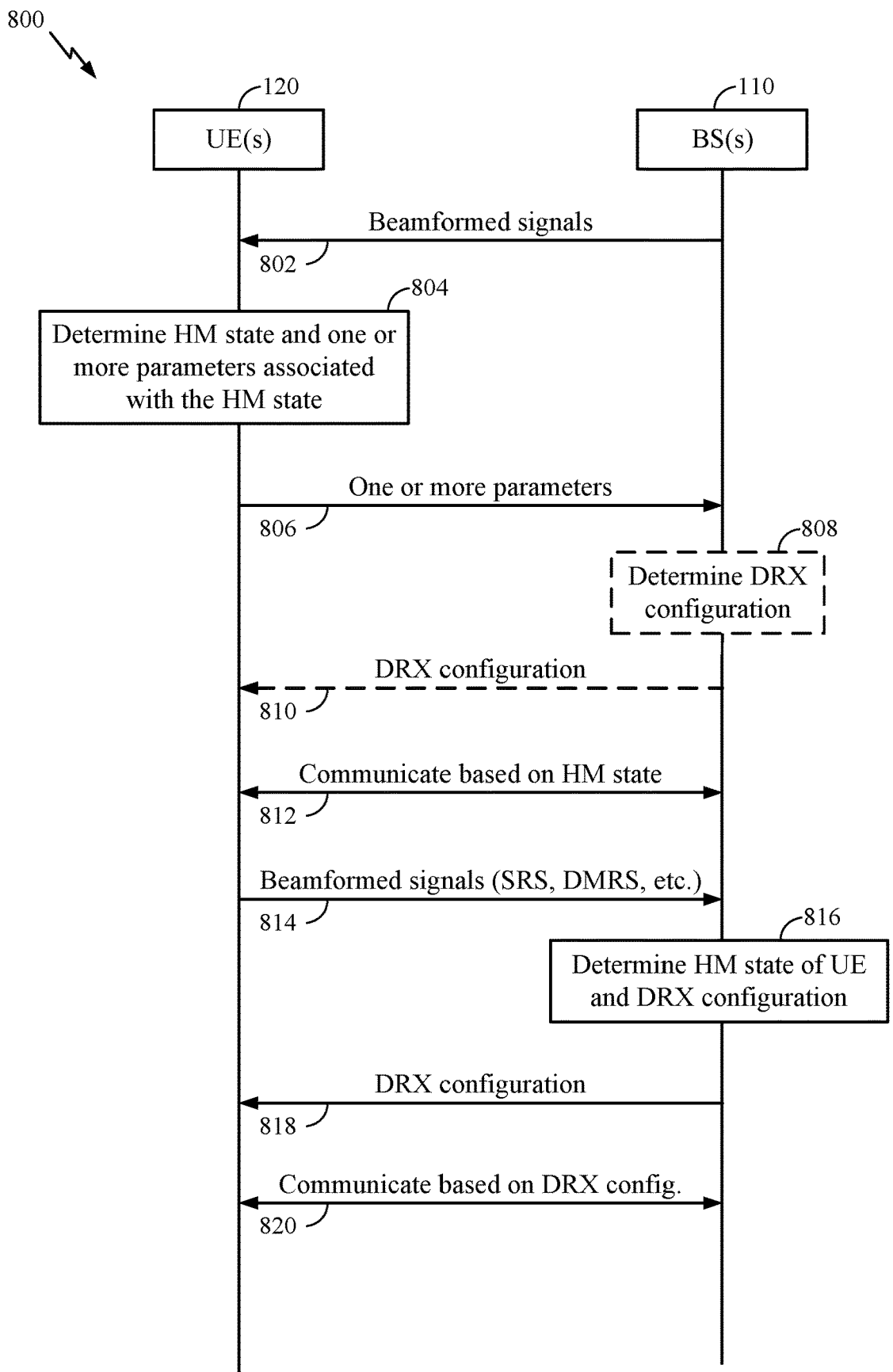
FIG. 8 is a call flow diagram illustrating example signaling for managing beams in a DRX cycle, in accordance with aspects of the present disclosure.

FIG. 8 is a call flow diagram illustrating example signaling for managing beams in a DRX cycle when a UE is in a high mobility state, in accordance with aspects of the present disclosure. At 802, the UE 120 may receive beamformed signals (e.g., a PSS, SSS, DMRS, phase-tracking reference signal (PT-RS), channel state information reference signal (CSI-RS), etc.) from the BS 110. At 804, the UE 120 may determine, based on the received signals, that the UE is in a high mobility (HM) state and one or more parameters (e.g., indications of measurements, events, or a DRX configuration) associated with the HM state of the UE. For example, the UE may determine that the UE is in the HM state, for example, based on the Doppler shift measured in the received signals and/or variations in the beam AOAs detected from the signals. At 806, the UE 120 may report the one or more parameters to the BS 110. For instance, the UE 120 may report the measurements of the signals, which may indicate that the UE is in the HM state. In certain cases, the UE 120 may report an indication of various events associated with the HM state, such as an indication that the UE is in the HM state, an indication that there is a large Doppler shift, or an indication that there is a variation in the beam AOAs. In certain cases, the UE 120 may request a DRX configuration that is adapted to the HM state of the UE. In aspects, the request for the DRX configuration may include various DRX parameters, such as an indication of a long DRX cycle, an indication of a short DRX cycle, etc.

Alternatively or optionally, at 808, the BS 110 may determine a DRX configuration for the UE 120 based at least in part on the one or more parameters. In aspects, the DRX configuration may be adapted to the HM state of the UE. In certain aspects, the DRX configuration may include a long DRX cycle, a short DRX cycle, a DRX pattern (a plurality of long and short DRX cycles that adapts to the track or tunnel), or a configuration that disables the DRX cycle and configures the UE to stay in a connected state. At 810, the BS 110 may transmit an indication of the DRX configuration to the UE 120, for example, via control signaling including radio resource control (RRC) signaling, downlink control information (DCI), or a medium access control (MAC) control element (CE).

At 812, the UE 120 may communicate with the BS 110 based on the one or more parameters. For example, the UE 120 may monitor PDCCH occasions according to a DRX configuration derived from the one or more parameters (e.g., the measurements of the beamformed signals). In certain cases, the UE 120 may implement the DRX configuration adapted from the one or more parameters with or without the indication from the BS 110 at 810. For instance, the UE 120 may monitor the PDCCH occasions based on a DRX configuration derived by the UE 120 from the measurements taken at 802 and reported to the BS 110. The UE 120 may select the DRX configuration based on certain rules in relation to the measurements or HM state events detected. The rules may also be known to the BS 110 such that the BS 110 can page the UE 120 according to the DRX configuration adopted by the UE 120. In certain cases, the BS 110 may direct the UE 120 to update the DRX configuration. For example, the UE 120 may monitor the PDCCH occasions based on the DRX configuration received from the BS 110 at 810.

In certain aspects, the BS may perform the measurements and instruct the UE to use an updated DRX configuration based on the HM state of the UE. For instance, at 814, the BS 110 may receive beamformed signals (e.g., a sounding reference signal (SRS), DMRS, PT-RS, etc.) from the UE 120. At 816, the BS 110 may determine that the UE 120 is in a HM state based on the received signals and a DRX configuration based on the HM state of the UE. At 818, the BS 110 may transmit an indication of the DRX configuration to the UE 120. At 820, the UE 120 may communicate with the BS 110 based on the indicated DRX configuration. For example, the UE 120 may monitor PDCCH occasions according to the indicated DRX configuration.

While the examples provided herein are described with respect to a single UE communicating with a single BS to facilitate understanding, aspects of the present disclosure may also be applied to the beam management being applied to multiples UEs and BSs arranged along a high speed railway, for example. For instance, at 802, the UE may receive the beamformed signals from multiple BSs, and the UE may receive the DRX configuration at 810 from a different BS. In certain cases, at 812, the UE may communicate with multiple BSs along the tunnel or track based on the HM state of the UE. In cases, the BS may receive beamformed signals from multiple UEs at 814 and configure different UEs at 818 based on the measurements of the beamformed signals.

Figure 9A:
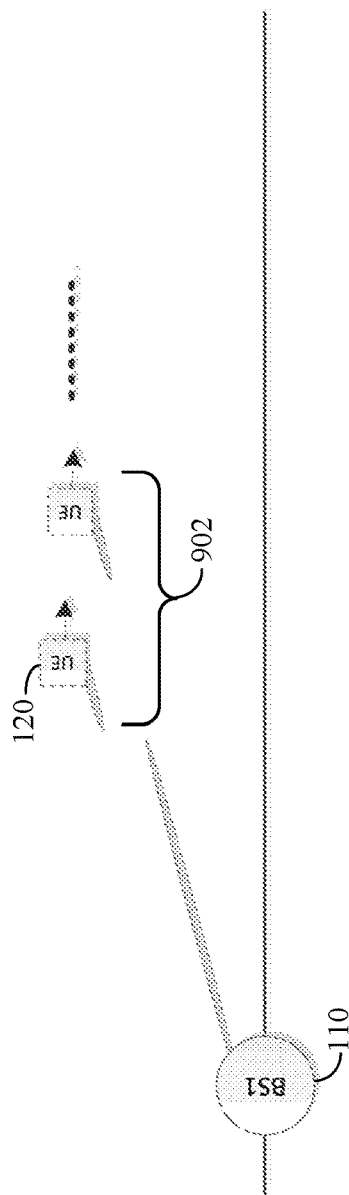
FIG. 9A illustrates an example of where an on-duration of a long or short DRX cycle may be configured for a UE, in accordance with certain aspects of the present disclosure.

In aspects, the DRX configuration may be adapted to the HM state of the UE and/or the RF conditions of the track or tunnel. For example, FIG. 9A illustrates an example of where an on-duration of a long or short DRX cycle may be configured for a UE, in accordance with certain aspects of the present disclosure. As shown, the UE 120 may be configured to monitor PDCCH occasions at on-duration 902 during the DRX cycle on the cell edges of the BS 110, such as when the UE is on the cell edges as depicted in case 1 of FIGS. 4A and 4B. In such cases, the beam AOA/AOD may be fairly constant, for example, enabling the UE 120 to use a single beam at each PDCCH occasion. That is, the beam direction may not change on the edges of the cell coverage of the BS 110, for example, when the UE enters the cell coverage or when the UE is exiting the cell coverage. The Doppler shift may also be estimated on the cell edges, enabling the UE 120 to take into account the Doppler effect when monitoring for the PDCCH occasions.

In certain cases, the on durations of a short DRX cycle may align with the angular shifts of the beam AOA as the UE passes the BS. As an example, referring to FIG. 5, the UE 120 may be configured with on-durations of the short DRX cycle at each point where the UE is using the beams 502, 504, 506, and 508. Such a short DRX cycle configuration may enable the UE to perform a preprogrammed beam switch at each on-duration. For example, each of the on-durations of the short DRX cycle may be associated with a certain beam to enable continuous beam alignment during PDCCH monitoring occasions of the short DRX cycles.

Figure 9B:
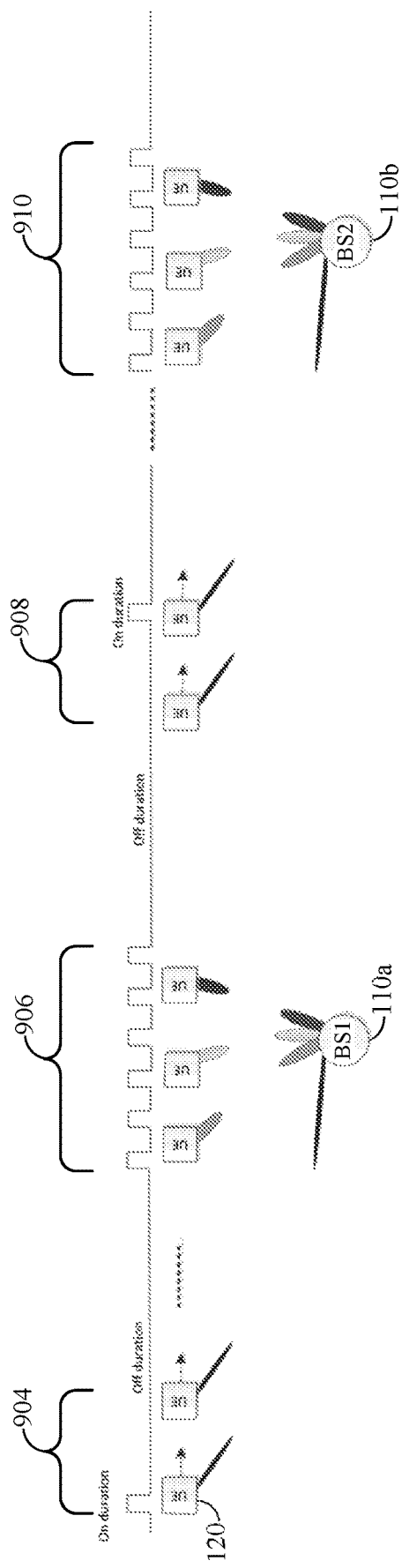
FIG. 9B illustrates an example of DRX pattern, in accordance with certain aspects of the present disclosure.

In certain cases, the UE may be configured with a DRX pattern adapted to the HM state of the UE and/or RF conditions of the track or tunnel. The DRX pattern may be determined based on the measurements of the Doppler effect and beam angular variations. In certain aspects, the DRX pattern may indicate that the long DRX cycle and short DRX cycle periodically switch depending on the track or tunnel scenario. FIG. 9B illustrates an example DRX pattern where on-durations of long or short DRX cycles may be configured for a UE, in accordance with certain aspects of the present disclosure. As shown, the on-durations 904, 908 of the long DRX cycles may be configured on the edges of the cell coverage for BS 110a and BS 110b, and the on-durations 906, 910 of the short DRX cycles may be configured as the UE 120 passes the BSs 110a, 110b, for example as described herein with respect to FIG. 5. In certain aspects, under a DRX pattern, the short DRX cycles may be triggered based on the location of the UE with respect to the BS without the expiration of the DRX inactivity timer. For example, as the UE 120 enters a certain vicinity with respect to the BS 110a, the UE 120 may initiate the short DRX cycles associated with the various beams. In aspects, the long or short DRX cycles may be set based on a time unit (e.g., milliseconds) or subframe offsets (or other time-domain resources such as slots, mini-slots, or symbols) that correspond to the position of the UE on the track or tunnel.

As another example of a DRX pattern, the long and short DRX cycles may be swapped with respect to FIG. 9B. That is, the short DRX cycles may be scheduled while the UE is on the cell edges, and the on-duration of the long DRX cycle may be scheduled when the UE passes the BS.

Figure 10:
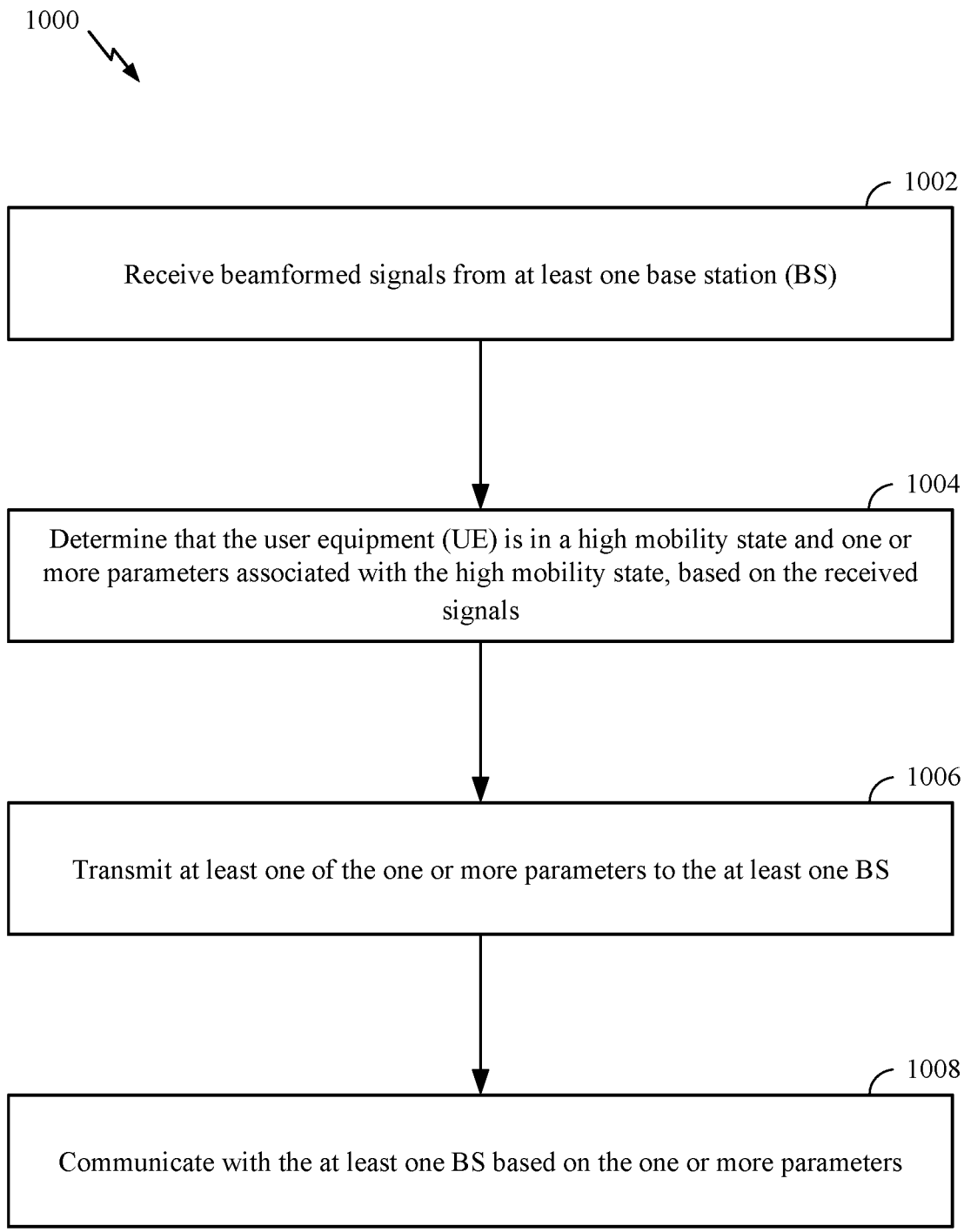
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., the UE 120 of FIG. 3). The operations 1000 may be implemented as software components that are executed and run on one or more processors (e.g., controller/processor 280 of FIG. 2). Further, the transmission and reception of signals by the UE in the operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at 1002, by the UE receiving beamformed signals from at least one BS (e.g., BSs 120a, 120b of FIG. 3). At 1004, the UE may determine that the UE is in a high mobility state and one or more parameters associated with the high mobility state, based on the received signals. At 1006, the UE may transmit at least one of the one or more parameters to the at least one BS. At 1008, the UE may communicate with the at least one BS based on the one or more parameters.

In aspects, the parameters determined by the UE at 1004 may include various indications of measurements, events, or a DRX configuration associated with the high mobility state of the UE. For instance, the one or more parameters may include at least one of a first indication of one or more measurements of the signals, where the measurements indicate the high mobility state of the UE, a second indication of one or more events associated with the high mobility state of the UE, or a third indication of a DRX configuration based on the high mobility state of the UE.

In aspects, the measurements of the received signals may include various properties of the signals or channel. For instance, the measurements may include at least one of a Doppler frequency shift, an angular variation associated with an angle of arrival of the signals, a Doppler spread, an average delay, a delay spread, or a signal quality of the signals. The signal quality may include a channel quality indicator, signal-to-noise ratio (SNR), signal-to-interference plus noise ratio (SINR), signal-to-noise plus distortion ratio (SNDR), a received signal strength indicator (RSSI), a reference signal received power (RSRP), a reference signal received quality (RSRQ), a precoding matrix indicator (PMI), etc.

In aspects, the event(s) reported to the BS at 1006 may include various events associated with the high mobility state of the UE. For example, the events include at least one of a high speed event, a Doppler shift event, or an angular variation event. In aspects, the high speed event may indicate that the UE is experiencing a high mobility state. In aspects, the Doppler shift event may indicate that the UE experienced a large frequency shift in the carrier frequency due to the Doppler effect, such as the Doppler shift encountered at case 1 of FIGS. 4A and 4B. In certain aspects, the angular variation event may indicate that the UE experienced a frequent change in beam AOA, such as the beam variations depicted in FIG. 5.

In certain aspects, the DRX configuration reported to the BS at 1006 may include various aspects of long or short DRX cycles, for example, including a DRX cycle, a long DRX cycle start offset, a DRX inactivity timer, an on-duration timer, a short DRX cycle, and/or a short DRX cycle timer. In aspects, the DRX configuration may include at least one of a configuration for a long DRX cycle (e.g., the DRX cycle described herein with respect to FIG. 9A), a configuration for a short DRX cycle (e.g., the short DRX cycle described herein with respect to FIG. 5), a DRX pattern (e.g., the DRX patterns described herein with respect to FIG. 9B), or a configuration for the UE to stay in a connected state with the at least one BS and disable the DRX cycle. In aspects, the configuration for the long or short DRX cycles may be associated with one or more beam AOAs that enable the UE to perform suitable beam switching during the PDCCH occasions as the UE travels along the track or tunnel.

In certain aspects, the configuration for the UE to stay in a connected state may configure the UE to monitor PDCCH occasions for a portion of the off duration of the DRX cycle or the entire off duration of the DRX cycle. For example, during the off duration of a long or short DRX cycle, the UE may remain in connected state to monitor PDCCH occasions. In aspects, the DRX configuration reported to the BS at 1006 may be a request for an updated DRX configuration that takes into account the high mobility state of the UE.

In certain aspects, the UE may update the DRX configuration based on the high mobility state of the UE. In certain cases, communicating with the at least one BS may include communicating with BS based on a DRX configuration included in the one or more parameters. In aspects, the DRX configuration comprises at least one of a configuration for a long DRX cycle, a configuration for a short DRX cycle, a DRX pattern, or a configuration for the UE to stay in a connected state with the at least one BS and disable the DRX cycle.

In certain aspects, the BS may configure the UE with a DRX configuration based on the high mobility state of the UE. For example, the operations 1000 may further include the UE receiving, from the at least one BS, an indication of a DRX configuration. The UE may communicate with the BS based on the DRX configuration. In aspects, the DRX configuration comprises at least one of a configuration for a long DRX cycle, a configuration for a short DRX cycle, a DRX pattern, or a configuration for the UE to stay in a connected state with the at least one BS and disable the DRX cycle. The indication of the DRX configuration may be received via RRC signaling, DCI, or a MAC-CE.

In aspects, the high mobility state may include various high speed applications, such as high speed trains or tunnels. In certain aspects, the high mobility state may include the UE moving at a speed of 350 kilometers per hour (km/h) to 650 km/h.

In certain aspects, the UE may communicate, at 1008, with the at least one BS via a single carrier frequency. The carrier frequency may be within a frequency range of 400 MHz to 7200 MHz or 24 GHz to 53 GHz. The single carrier frequency may reduce inter-carrier interference due to the large Doppler shift encountered in the high mobility state. The single carrier frequency may improve handovers as the UE moves along the track or tunnel.

Figure 11:
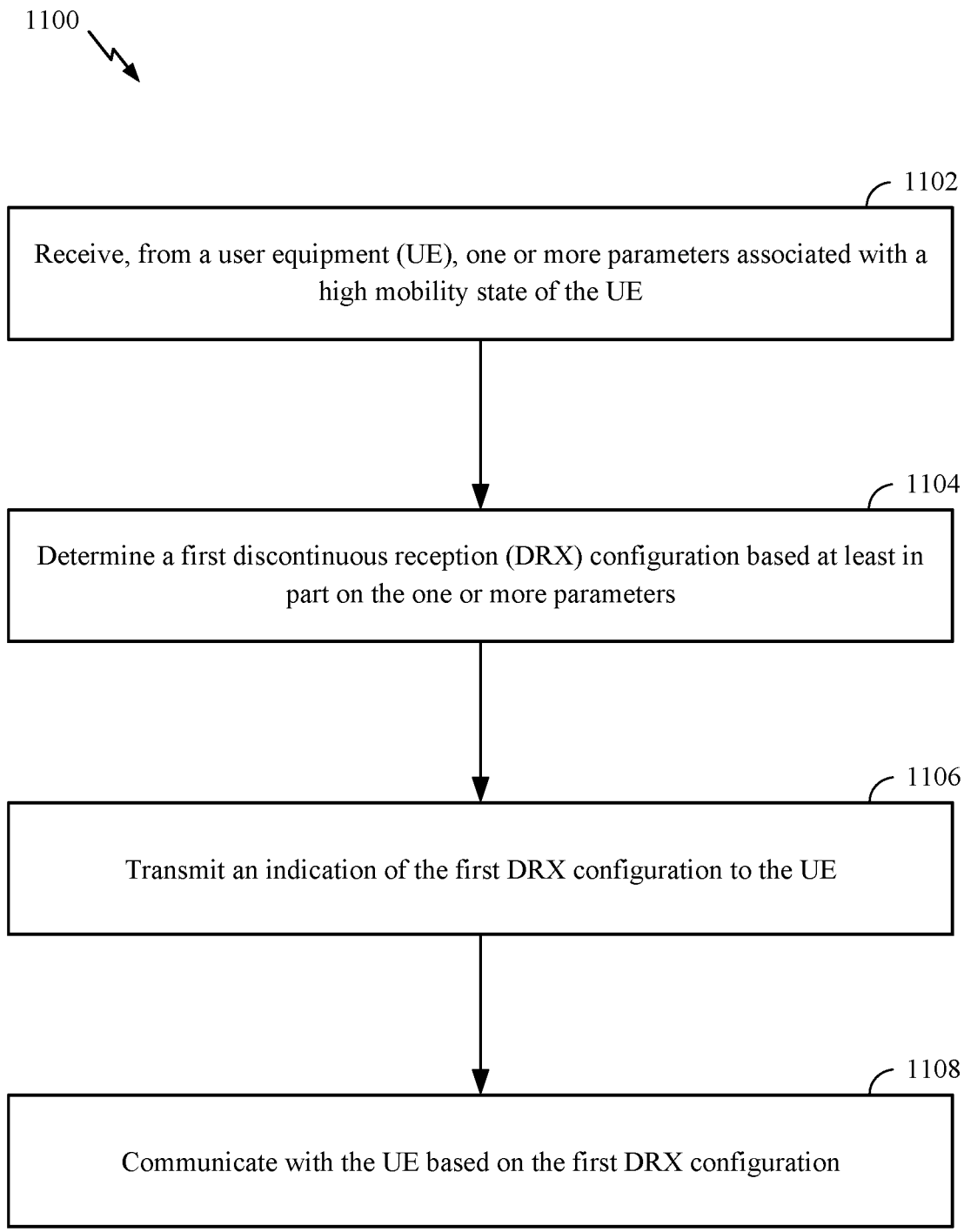
FIG. 11 is a flow diagram illustrating example operations for wireless communication by a BS, in accordance with certain aspects of the present disclosure.

FIG. 11 is a flow diagram illustrating example operations 1100 for wireless communication, in accordance with certain aspects of the present disclosure. The operations 1100 may be performed, for example, by a BS (e.g., the BS 110*a* of FIG. 3). The operations 1100 may be complimentary to the operations 1000 performed by the UE. The operations 1100 may be implemented as software components that are executed and run on one or more processors (e.g., controller/processor 240 of FIG. 2). Further, the transmission and reception of signals by the BS in the operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1100 may begin, at 1102, by the BS receiving, from a UE (e.g., the UE 120 of FIG. 3), one or more parameters associated with a high mobility state of the UE. At 1104, the BS may determine a first DRX configuration based at least in part on the one or more parameters. At 1106, the BS may transmit an indication of the first DRX configuration to the UE. At 1108, the BS may communicate with the UE based on the first DRX configuration.

In certain aspects, the DRX configuration may indicate various aspects of DRX cycles adapted for the high mobility state of the UE. The DRX configuration may indicate a DRX cycle, a long DRX cycle start offset, a DRX inactivity timer, an on-duration timer, a short DRX cycle, and/or a short DRX cycle timer. For instance, the first DRX configuration of the operations 1100 may include at least one of a configuration for a long DRX cycle, a configuration for a short DRX cycle, a DRX pattern, or a configuration for the UE to stay in a connected state with the at least one BS and disable the DRX cycle. In certain aspects, the configuration for the UE to stay in a connected state may configure the UE to monitor PDCCH occasions for a portion of the off duration of the DRX cycle or the entire off duration of the DRX cycle.

In aspects, the BS may transmit the indication of the first DRX configuration via control signaling. For example, the indication of the first DRX configuration may be transmitted via RRC signaling, DCI, or a MAC-CE.

In aspects, the parameters received by the BS at 1102 may include various indications of measurements, events, or a DRX configuration associated with the high mobility state of the UE. In certain cases, the one or more parameters may include at least one of a first indication of one or more measurements of signals received by UE, where the measurements indicate the high mobility state of the UE, a second indication of one or more events associated with the high mobility state of the UE, or a third indication of a second DRX configuration based on the high mobility state of the UE.

In aspects, the measurements received by the BS at 1102 may include various properties of the signals or channel monitored by the UE. For instance, the measurements may include at least one of a Doppler frequency shift, an angular variation associated with an angle of arrival of the signals, a Doppler spread, an average delay, a delay spread, or a signal quality of the signals. The signal quality may include a channel quality indicator, signal-to-noise ratio (SNR), signal-to-interference plus noise ratio (SINR), signal-to-noise plus distortion ratio (SNDR), a received signal strength indicator (RSSI), a reference signal received power (RSRP), a reference signal received quality (RSRQ), a precoding matrix indicator (PMI), etc.

In aspects, the event(s) reported to the BS at 1102 may include various events associated with the high mobility state of the UE. For example, the events include at least one of a high speed event, a Doppler shift event, or an angular variation event. In aspects, the high speed event may indicate that the UE is experiencing a high mobility state. In aspects, the Doppler shift event may indicate that the UE experienced a large frequency shift in the carrier frequency due to the Doppler effect, such as the Doppler shift encountered at case 1 of FIGS. 4A and 4B. In certain aspects, the angular variation event may indicate that the UE experienced a frequent change in beam AOA, such as the beam variations depicted in FIG. 5.

In certain aspects, the second DRX configuration reported to the BS at 1102 may include various aspects of long or short DRX cycles, for example, including a DRX cycle, a long DRX cycle start offset, a DRX inactivity timer, an on-duration timer, a short DRX cycle, and/or a short DRX cycle timer. In aspects, the second DRX configuration may include at least one of a configuration for a long DRX cycle (e.g., the DRX cycle described herein with respect to FIG. 9A), a configuration for a short DRX cycle (e.g., the short DRX cycle described herein with respect to FIG. 5), a DRX pattern (e.g., the DRX patterns described herein with respect to FIG. 9B), or a configuration for the UE to stay in a connected state with the at least one BS and disable the DRX cycle. In certain aspects, the configuration for the UE to stay in a connected state may configure the UE to monitor PDCCH occasions for a portion of the off duration of the DRX cycle or the entire off duration of the DRX cycle. For example, during the off duration of a long or short DRX cycle, the UE may remain in connected state to monitor PDCCH occasions. In aspects, the second DRX configuration reported to the BS at 1102 may be a request for an updated DRX configuration that takes into account the high mobility state of the UE. That is, in certain cases, the one or more parameters received at 1102 may include the request for an updated DRX configuration.

In aspects, the first DRX configuration may include the second DRX configuration. For example, the BS may adopt the second DRX configuration as the first DRX configuration. In aspects, the first DRX configuration is different from the second DRX configuration. For example, the BS may adjust the second DRX configuration, for example, based on various factors, which results in the first DRX configuration.

In aspects, the high mobility state may include various high speed applications, such as high speed trains or tunnels. In certain aspects, the high mobility state may include the UE moving at a speed of 350 km/h to 650 km/h.

In certain aspects, the BS may communicate, at 1108, with the at least one BS via a single carrier frequency. The carrier frequency may be within a frequency range of 400 MHz to 7200 MHz or 24 GHz to 53 GHz. The single carrier frequency may reduce inter-carrier interference due to the large Doppler shift encountered in the high mobility state. The single carrier frequency may improve handovers as the UE moves along the track or tunnel.

Figure 12:
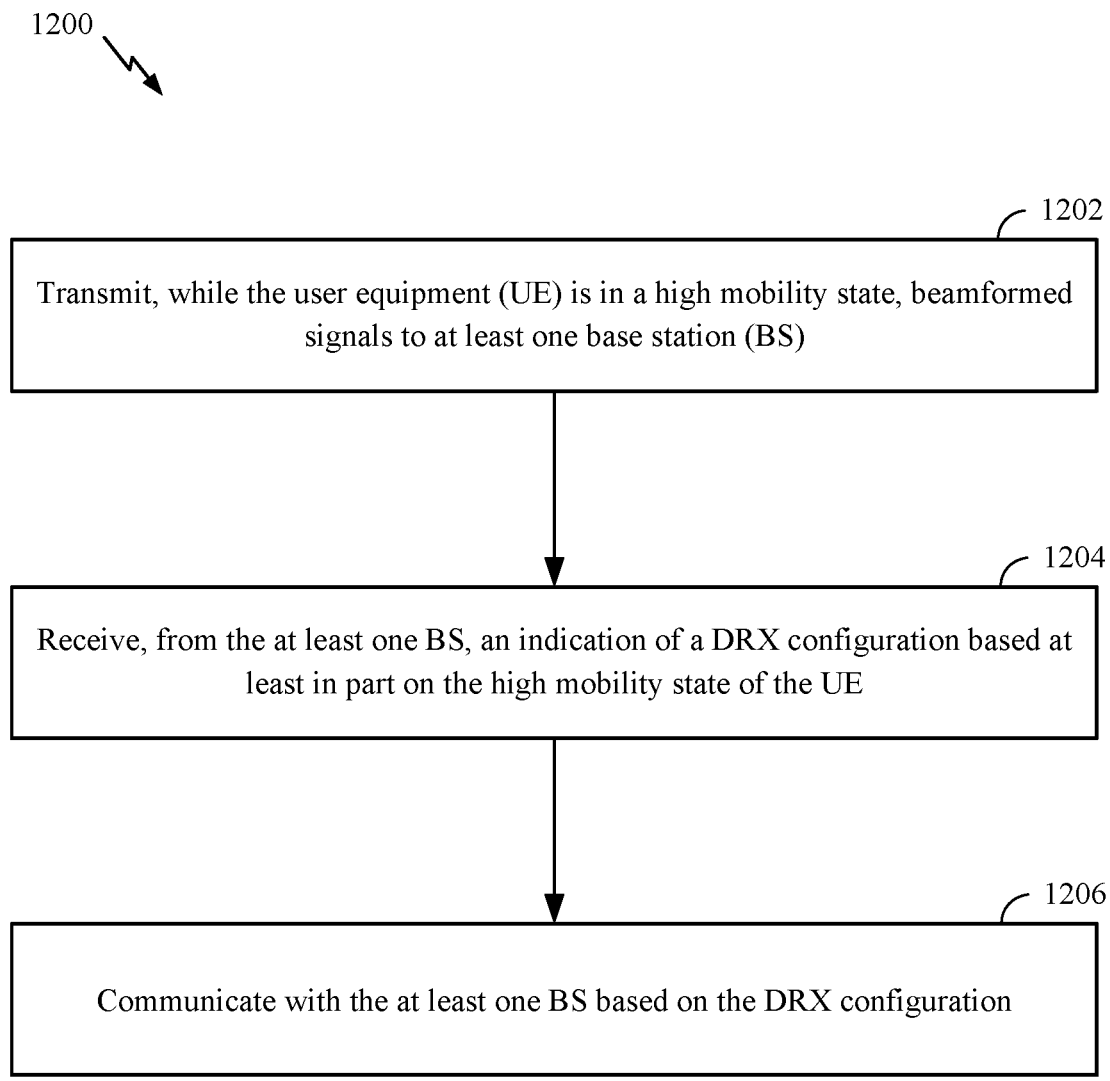
FIG. 12 is a flow diagram illustrating another example of operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., the UE 120 of FIG. 3). The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at 1202, by the UE transmitting, while the UE is in a high mobility state, beamformed signals to at least one BS (e.g., BS(s) 120*a*, 120*b* of FIG. 3). At 1204, the UE may receive, from the at least one BS, an indication of a DRX configuration based at least in part on the high mobility state of the UE. At 1206, the UE may communicate with the at least one BS based on the DRX configuration.

In certain aspects, the DRX configuration received by UE at 1204 may include various aspects of long or short DRX cycles, for example, including a DRX cycle, a long DRX cycle start offset, a DRX inactivity timer, an on-duration timer, a short DRX cycle, and/or a short DRX cycle timer. In aspects, the DRX configuration may include at least one of a configuration for a long DRX cycle (e.g., the DRX cycle described herein with respect to FIG. 9A), a configuration for a short DRX cycle (e.g., the short DRX cycle described herein with respect to FIG. 5), a DRX pattern (e.g., the DRX patterns described herein with respect to FIG. 9B), or a configuration for the UE to stay in a connected state with the at least one BS and disable the DRX cycle. In certain aspects, the configuration for the UE to stay in a connected state may configure the UE to monitor PDCCH occasions for a portion of the off duration of the DRX cycle or the entire off duration of the DRX cycle. For example, during the off duration of a long or short DRX cycle, the UE may remain in connected state to monitor PDCCH occasions. The indication of the DRX configuration may be received via RRC signaling, DCI, or a MAC-CE.

In aspects, the UE may transmit at 1202 various uplink reference signals. That is, the beamformed signals may include an uplink reference signal. The uplink reference signal may include at least one of a SRS, a DMRS, or a PT-RS.

In aspects, the high mobility state may include various high speed applications, such as high speed trains or tunnels. In certain aspects, the high mobility state may include the UE moving at a speed of 350 km/h to 650 km/h.

In certain aspects, the UE may communicate, at 1206, with the at least one BS via a single carrier frequency. The carrier frequency may be within a frequency range of 400 MHz to 7200 MHz or 24 GHz to 53 GHz. The single carrier frequency may reduce inter-carrier interference due to the large Doppler shift encountered in the high mobility state. The single carrier frequency may improve handovers as the UE moves along the track or tunnel.

Figure 13:
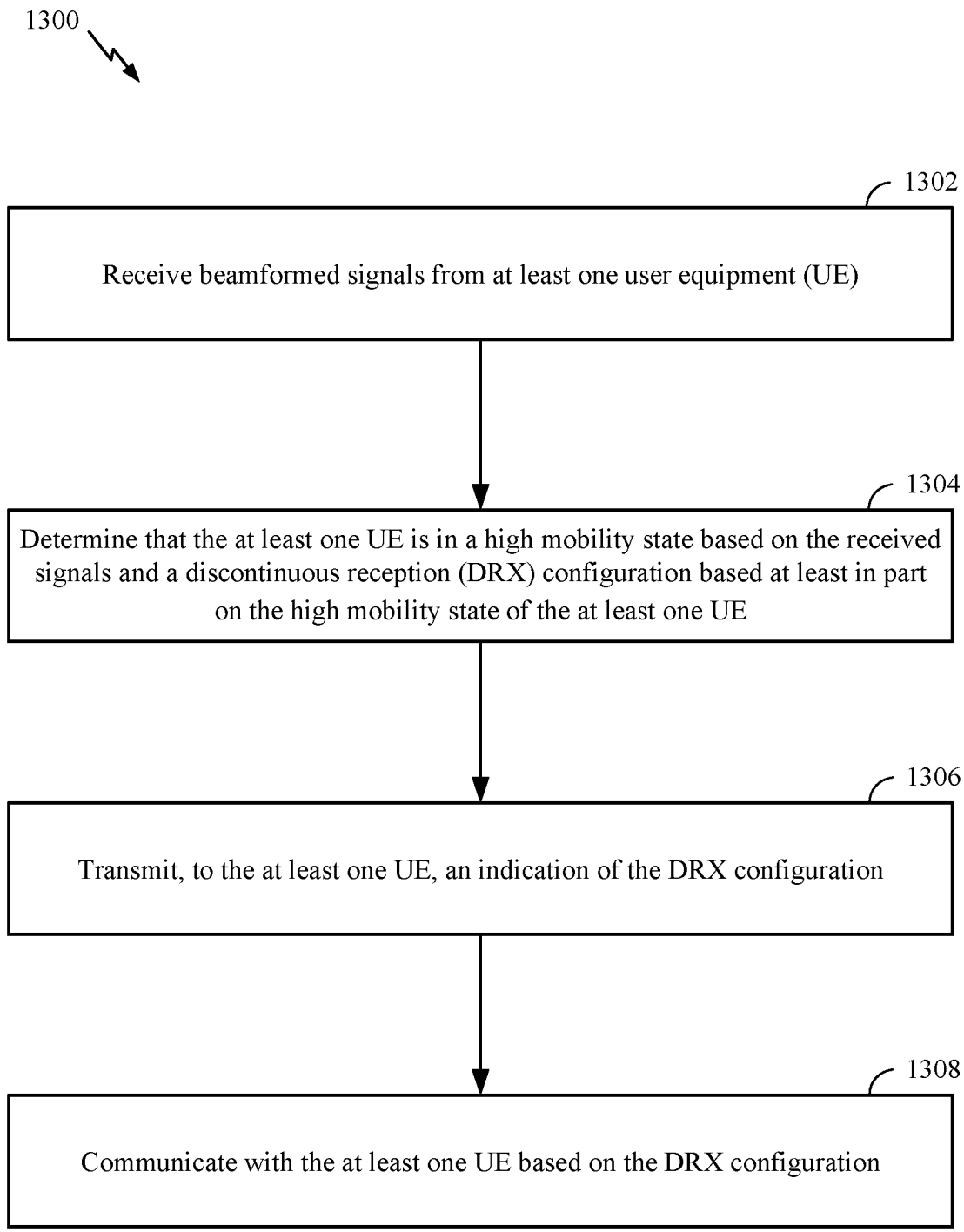
FIG. 13 is a flow diagram illustrating another example of operations for wireless communication by a BS, in accordance with certain aspects of the present disclosure.

FIG. 13 is a flow diagram illustrating example operations 1300 for wireless communication, in accordance with certain aspects of the present disclosure. The operations 1300 may be performed, for example, by a BS (e.g., the BS 110*a* of FIG. 3). The operations 1300 may be complimentary to the operations 1200 performed by the UE. The operations 1300 may be implemented as software components that are executed and run on one or more processors (e.g., controller/processor 240 of FIG. 2). Further, the transmission and reception of signals by the BS in the operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at 1302, by the BS receiving beamformed signals from at least one UE (e.g., the UE 120 of FIG. 3). At 1304, the BS may determine that the at least one UE is in a high mobility state based on the received signals and a DRX configuration based at least in part on the high mobility state of the at least one UE. At 1306, the BS may transmit, to the at least one UE, an indication of the DRX configuration. At 1308, the BS may communicate with the at least one UE based on the DRX configuration.

In aspects, the BS may determine that the at least one UE is in the high mobility state based on various measurements of the signals that indicate the high mobility state of the UE, such as a Doppler frequency shift (e.g., >800 Hz or a certain threshold) and frequent variations in the angle of arrival of the signals. For example, the measurements may include various properties of the signals or channel monitored by the BS. In aspects, the measurements may include at least one of a Doppler frequency shift, an angular variation associated with an angle of arrival of the signals, a Doppler spread, an average delay, a delay spread, or a signal quality of the signals. The signal quality may include a channel quality indicator, signal-to-noise ratio (SNR), signal-to-interference plus noise ratio (SINR), signal-to-noise plus distortion ratio (SNDR), a received signal strength indicator (RSSI), a precoding matrix, etc.

In certain aspects, the DRX configuration may indicate various aspects of DRX cycles adapted for the high mobility state of the UE. The DRX configuration may indicate a DRX cycle, a long DRX cycle start offset, a DRX inactivity timer, an on-duration timer, a short DRX cycle, and/or a short DRX cycle timer. For instance, the DRX configuration of the operations 1300 may include at least one of a configuration for a long DRX cycle, a configuration for a short DRX cycle, a DRX pattern, or a configuration for the UE to stay in a connected state with the at least one BS and disable the DRX cycle. In certain aspects, the configuration for the UE to stay in a connected state may configure the UE to monitor PDCCH occasions for a portion of the off duration of the DRX cycle or the entire off duration of the DRX cycle.

In aspects, the BS may transmit the indication of the DRX configuration via control signaling. For example, the indication of the first DRX configuration may be transmitted via RRC signaling, DCI, or a MAC-CE.

In aspects, the BS may receive at 1302 various uplink reference signals. That is, the beamformed signals may include an uplink reference signal. The uplink reference signal may include at least one of a SRS, a DMRS, or a PT-RS.

In aspects, the high mobility state may include various high speed applications, such as high speed trains or tunnels. In certain aspects, the high mobility state may include the UE moving at a speed of 350 km/h to 650 km/h.

In certain aspects, the BS may communicate, at 1308, with the UE via a single carrier frequency. The carrier frequency may be within a frequency range of 400 MHz to 7200 MHz or 24 GHz to 53 GHz. The single carrier frequency may reduce inter-carrier interference due to the large Doppler shift encountered in the high mobility state. The single carrier frequency may improve handovers as the UE moves along the track or tunnel.

Figure 14:
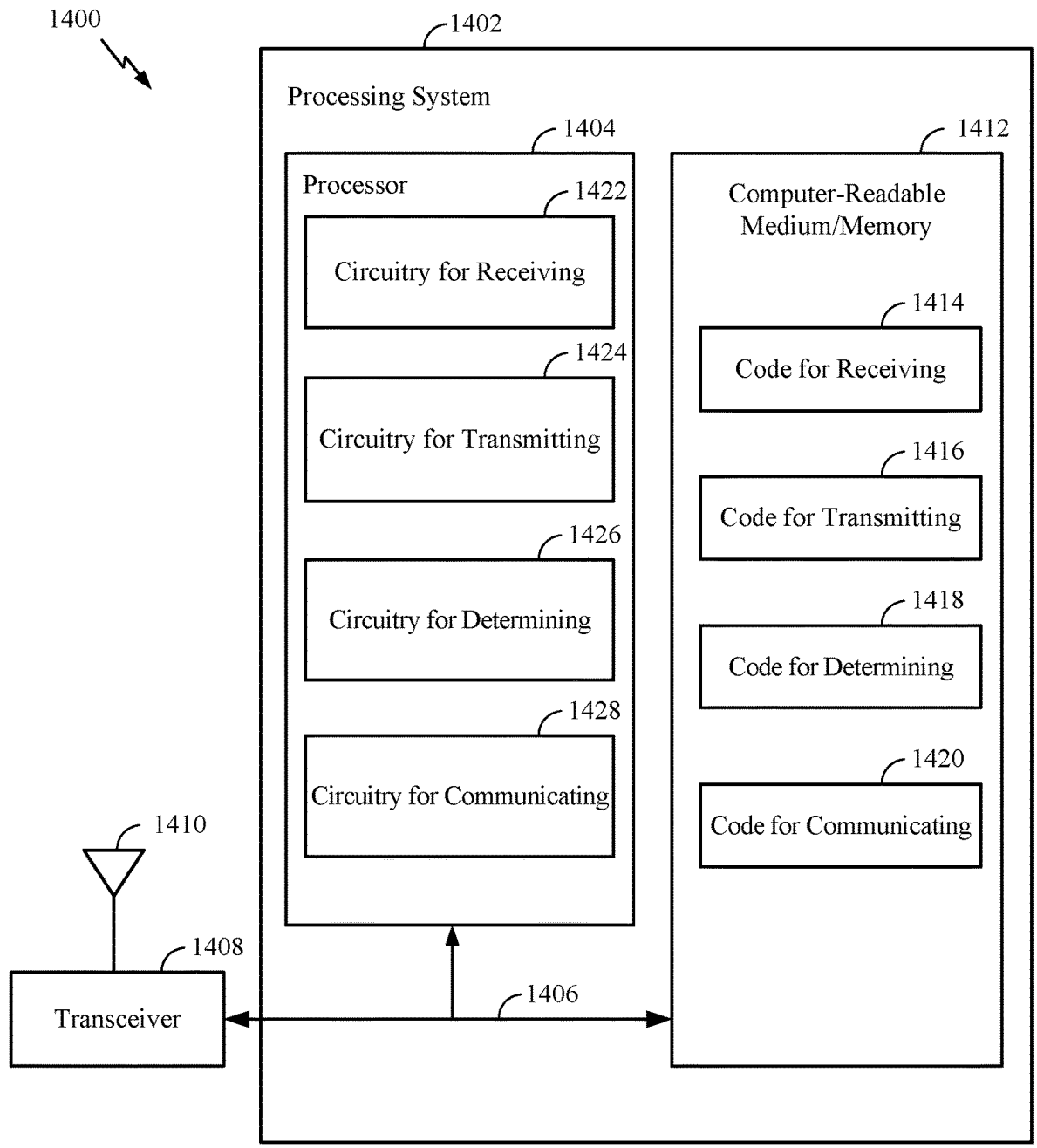
FIG. 14 illustrates a communications device (e.g., a UE or BS) that may include various components configured to perform operations for the techniques disclosed herein in accordance with aspects of the present disclosure.

FIG. 14 illustrates a communications device 1400 (e.g., a UE or BS) that may include various components (e.g., corresponding to means-plus-function components) configured to perform operations for the techniques disclosed herein, such as the operations illustrated in FIGS. 10-13. The communications device 1400 includes a processing system 1402 coupled to a transceiver 1408 (e.g., a transmitter and/or receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIGS. 10-13, or other operations for performing the various techniques discussed herein for DRX beam management in high speed applications. In certain aspects, computer-readable medium/memory 1412 stores code for receiving 1414, code for transmitting 1416, code for determining 1418, and/or code for communicating 1420 (which may include the code for receiving 1414 and/or the code for transmitting 1416). In certain aspects, the processor 1404 has circuitry configured to implement the code stored in the computer-readable medium/memory 1412. The processor 1404 includes circuitry for receiving 1422, circuitry for transmitting 1424, circuitry for determining 1426, and/or circuitry for communicating 1428.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP) cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
   receiving beamformed signals from at least one base station (BS);
   determining a high mobility state of the UE and one or more parameters associated with the high mobility state, based on the beamformed signals, wherein the one or more parameters include a first indication of a discontinuous reception (DRX) configuration based on the high mobility state of the UE;
   transmitting at least one of the one or more parameters to the at least one BS; and
   communicating with the at least one BS based on the one or more parameters.

2. The method of claim 1, wherein the one or more parameters include:
   a second indication of one or more measurements of the beamformed signals, wherein the measurements indicate the high mobility state of the UE, or a third indication of one or more events associated with the high mobility state of the UE.

3. The method of claim 2, wherein the measurements include at least one of a Doppler frequency shift, an angular variation associated with an angle of arrival of the beamformed signals, or a signal quality of the beamformed signals.

4. The method of claim 2, wherein the events include at least one of a high speed event, a Doppler shift event, or an angular variation event.

5. The method of claim 1, wherein the DRX configuration includes at least one of:
   a configuration for a long DRX cycle,
   a configuration for a short DRX cycle,
   a DRX pattern, or
   a configuration for the UE to stay in a connected state with the at least one BS and disable the DRX cycle.

6. The method of claim 1, wherein:
   communicating with the at least one BS comprises communicating with the at least one BS based on a DRX configuration included in the one or more parameters, and
   the DRX configuration comprises at least one of a configuration for a long DRX cycle, a configuration for a short DRX cycle, a DRX pattern, or a configuration for the UE to stay in a connected state with the at least one BS and disable the DRX cycle.

7. The method of claim 1, further comprising:
   receiving, from the at least one BS, an indication of a DRX configuration;
   wherein communicating with the at least one BS comprises communicating with the at least one BS based on the DRX configuration; and
   wherein the DRX configuration comprises at least one of a configuration for a long DRX cycle, a configuration for a short DRX cycle, a DRX pattern, or a configuration for the UE to stay in a connected state with the at least one BS and disable the DRX cycle.

8. The method of claim 7, wherein the indication is received via radio resource control signaling, downlink control information, or a medium access control (MAC) control element.

9. The method of claim 1, wherein the high mobility state includes the UE moving at a speed of 350 kilometers per hour (km/h) to 650 km/h.

10. The method of claim 1, wherein communicating with the at least one BS comprises communicating with the at least one BS via a single carrier frequency.

11. The method of claim 10, wherein the carrier frequency is within a frequency range of 400 MHz to 7200 MHz or 24 GHz to 53 GHz.

12. A method of wireless communication by a base station (BS}, comprising:
   receiving, from a user equipment (UE), one or more parameters associated with a high mobility state of the UE;
   determining a first discontinuous reception (DRX) configuration based at least in part on the one or more parameters;
   transmitting an indication of the first DRX configuration to the UE; and
   communicating with the UE based on the first DRX configuration.

13. The method of claim 12, wherein the first DRX configuration comprises at least one of:
   a configuration for a long DRX cycle,
   a configuration for a short DRX cycle,
   a DRX pattern, or
   a configuration for the UE to stay in a connected state with the BS and disable the DRX cycle.

14. The method of claim 12, wherein the indication is transmitted via radio resource control signaling, downlink control information, or a medium access control (MAC) control element.

15. The method of claim 12, wherein the one or more parameters include at least one of:
   a first indication of one or more measurements of beamformed signals received by UE, wherein the measurements indicate the high mobility state of the UE,
   a second indication of one or more events associated with the high mobility state of the UE, or
   a third indication of a second DRX configuration based on the high mobility state of the UE.

16. The method of claim 15, wherein the measurements include at least one of a Doppler frequency shift, an angular variation associated with an angle of arrival of the beamformed signals, or a signal quality of the beamformed signals.

17. The method of claim 15, wherein the events include at least one of a high speed event, a Doppler shift event, or an angular variation event.

18. The method of claim 15, wherein the second DRX configuration includes at least one of:
   a configuration for a long DRX cycle,
   a configuration for a short DRX cycle,
   a DRX pattern, or
   a configuration for the UE to stay in a connected state with the BS and disable the DRX cycle.

19. The method of claim 15, wherein the first DRX configuration includes the second DRX configuration.

20. The method of claim 15, wherein the first DRX configuration is different from the second DRX configuration.

21. The method of claim 12, wherein communicating with the UE comprises communicating with the UE via a single carrier frequency.

22. A method of wireless communication by a user equipment (UE), comprising:
   transmitting, while the UE is in a high mobility state, beamformed signals to at least one base station (BS);
   receiving, from the at least one BS, an indication of a DRX configuration based at least in part on the high mobility state of the UE; and
   communicating with the at least one BS based on the DRX configuration.

23. The method of claim 22, wherein the DRX configuration comprises at least one of:
   a configuration for a long DRX cycle,
   a configuration for a short DRX cycle,
   a DRX pattern, or
   a configuration for the UE to stay in a connected state with the at least one BS and disable the DRX cycle.

24. The method of claim 22, wherein the indication is received via radio resource control signaling, downlink control information, or a medium access control (MAC) control element.

25. The method of claim 22, wherein the beamformed signals include an uplink reference signal.

26. The method of claim 25, wherein the uplink reference signal includes at least one of a sounding reference signal, a demodulation reference signal, or a phase tracking reference signal.

27. The method of claim 22, wherein the high mobility state includes the UE moving at a speed of 350 kilometers per hour (km/h) to 650 km/h.

28. The method of claim 22, wherein communicating with the at least one BS comprises communicating with the at least one BS via a single carrier frequency.

29. The method of claim 28, wherein the carrier frequency is within a frequency range of 400 MHz to 7200 MHz or 24 GHz to 53 GHz.

30. A method of wireless communication by a base station (BS}, comprising:
   receiving beamformed signals from at least one user equipment (UE);
   determining that the at least one UE is in a high mobility state based on the beamformed signals and a discontinuous reception (DRX) configuration based at least in part on the high mobility state of the at least one UE;
   transmitting, to the at least one UE, an indication of the DRX configuration; and
   communicating with the at least one UE based on the DRX configuration.

31. The method of claim 30, wherein the DRX configuration comprises at least one of:
   a configuration for a long DRX cycle,
   a configuration for a short DRX cycle,
   a DRX pattern, or
   a configuration for the UE to stay in a connected state with the BS and disable the DRX cycle.

32. The method of claim 30, wherein the indication is transmitted via radio resource control signaling, downlink control information, or a medium access control (MAC) control element.

33. The method of claim 30, wherein the beamformed signals include an uplink reference signal.

34. The method of claim 33, wherein the uplink reference signal includes at least one of a sounding reference signal, a demodulation reference signal, or a phase tracking reference signal.

35. The method of claim 30, wherein communicating with the at least one UE comprises communicating with the at least one UE via a single carrier frequency.

* * * * *